United States Patent [19]
Sone et al.

[11] Patent Number: 5,634,259
[45] Date of Patent: Jun. 3, 1997

[54] METHOD OF MANUFACTURING A MAGNETIC HEAD

[75] Inventors: Katsuhide Sone; Muneo Kamiguchi, both of Kawasaki, Japan

[73] Assignee: Fujitsu Limited, Kawasaki, Japan

[21] Appl. No.: 401,958

[22] Filed: Mar. 10, 1995

[30] Foreign Application Priority Data

Mar. 17, 1994 [JP] Japan ................. 6-047518

[51] Int. Cl.$^6$ ................................................. G11B 5/42
[52] U.S. Cl. ............................. 29/603.12; 29/603.14; 360/103
[58] Field of Search ........................ 29/603.12, 603.14, 29/603.15; 360/103–106

[56] References Cited

U.S. PATENT DOCUMENTS 4,624,048  11/1986  Hinkel et al. ..................... 29/603
5,065,500  11/1991  Yoneda et al. .................... 29/603

FOREIGN PATENT DOCUMENTS

| | | |
|---|---|---|
| 55-101135 | 8/1980 | Japan . |
| 61-196487 | 8/1986 | Japan . |
| 61-210511 | 9/1986 | Japan . |
| 3-120608 | 5/1991 | Japan . |
| 4-335276 | 11/1992 | Japan . |

*Primary Examiner*—Carl E. Hall
*Attorney, Agent, or Firm*—Greer, Burns & Crain, Ltd.

[57] ABSTRACT

A thin-film element is formed at an end of a core slider, at which end air exits, and a protective film is formed on the thin-film element. A step-like recess is formed in the protective film near the thin-film element so as to extend longitudinally toward an end at which air exits.

5 Claims, 19 Drawing Sheets

F I G. 5

| TEMPERATURE RISE / APPARATUS | 0 (NOT CONDUCTING) | 10°C | 20°C | 30°C | 40°C | 50°C [nm] |
|---|---|---|---|---|---|---|
| APPARATUS 1 | 13.92 | 7.92 | 1.92 | −4.08 | −10.08 | −16.08 |
| APPARATUS 2 | 5.74 | −0.26 | −6.26 | −12.26 | −18.26 | −24.26 |

DISK SURFACE

FIG. 7

| TEMPERATURE RISE | A' E | 45 [μm] | 40 | 35 | 30 | 25 [nm] |
|---|---|---|---|---|---|---|
| 10 °C | | − 0.26 | + 1.42 | + 3.09 | + 4.76 | + 6.44 |
| 20 °C | | − 6.26 | − 3.38 | − 0.51 | + 2.36 | + 5.24 |
| 30 °C | | −12.26 | − 8.18 | − 4.11 | − 0.04 | + 4.04 |

METHOD OF MANUFACTURING A MAGNETIC HEAD

BACKGROUND OF THE INVENTION

1. Field of the Invention

The present invention relates to a magnetic head used in a magnetic disk apparatus for recording information on and reproducing information from a recording medium.

Recently, as the scale of a magnetic disk apparatus has been reduced and the storage capacity thereof has been enlarged, the recording density of a recording medium has become high, and thus a magnetic head which floats low over the disk (small clearance) is required. However, because of the requirement that the magnetic head be resistant to shock, there is also a need to reduce occurrences of contact between the magnetic head and the disk.

2. Description of the Prior Art

FIGS. 1A, 1B and 1C show a construction of a conventional magnetic head. Referring to FIG. 1A, two rail surfaces 13a and 13b are formed on the surface of a core slider 12 of a magnetic head 11, which surface faces a magnetic disk (recording medium). The rail surfaces 13a and 13b are made to extend in the direction in which air flows. Tapered surfaces 14a and 14b which allow the head to float are formed on the side at which air enters the space between the head and the disk.

On an end face of the rail surface 13a at which face air exits the space between the head and the disk, a thin-film element 15 for writing and reading information is provided. As shown in FIG. 1B, the thin-film element 15 is formed such that an insulating film (alumina) 16 is formed on the end face of the core slider 12 (rail surface 13a), and a magnetic film 17 is formed on the insulating film 16. An insulating film 18 is formed on the magnetic film 17, and a coil 19 is provided in the insulating film 18. A magnetic film 20 is formed on the insulating film 18. Recording and reproduction are performed in a gap 22 formed between the magnetic film 17 and the magnetic film 20. A protective film (insulating film) 21 is formed on the magnetic film 20 in the thin-film element 15. The shaded area indicates that portion of the protective film which is susceptible to temperature increase.

The rail surfaces 13a and 13b are chamfered (applied with a lapping process) as indicated by broken lines in FIG. 1C so as to allow air to flow smoothly. Both the width and height of the chamfering are 0–10 µm. A distance L between the end face of the core slider 12 and the end of the protective film 21 is set such that $L \geq 0.025$ mm. A distance S (thickness of the protective film) between the magnetic film 20 and the end of the protective film 21 is set such that $S \approx 0.015$–$0.02$ mm.

The magnetic head 11 is enabled to float over the magnetic disk by receiving an air flow generated by the rotating magnetic disk. In order that damage caused by the contacting of the magnetic head 11 with the magnetic disk be minimized, a thin film of DLC (diamond-like carbon) or the like may be provided on the rail surfaces 13a and 13b (including the tapered surfaces 14a and 14b) and/or on the magnetic disk, or burrs created by the chamfering of the rail surfaces 13a and 13b may be removed.

FIG. 2 explains thermal expansion of the protective film of the conventional magnetic head. Referring to FIG. 2, when the magnetic head 11 is driven for a recording operation, the temperature of the thin-film element 15 rises because a current is fed to the coil 19, with the result that the protective film 21 swells due to thermal expansion, as indicated by a shaded end part 21' in FIG. 2. For example, it was experimentally found that a swelling of the protective film 21 of alumina measured 6 nm per a temperature rise of 10° C.

Hence, the narrowest achievable separation (clearance) between the magnetic head 11 and the magnetic disk depends on the magnitude of the swelling of the protective film 21 and on the spacing between the head and the disk. Accordingly, frequent contacts between the head and the disk is invited. Powder created from abrasion damages the thin-film element 15 and the disk. Therefore, it becomes difficult to secure small clearance.

Further, the chamfering of the rail surfaces 13a and 13b of the core slider 12 is done after a wafer having the thin-film element 15 formed thereon is cut and the rail surfaces 13a and 13b are formed. If the chamfering process is applied to the thin-film element 15, a variation in the quality of the produced head results. For example, the electro-magnetic transducing property may deteriorate.

SUMMARY OF THE INVENTION

Accordingly, it is a general object of the present invention to provide a novel and useful magnetic head in which the aforementioned problems of the prior art are eliminated.

Another and more specific object of the present invention is to provide a magnetic head in which small clearance of the head with respect to the recording medium is secured.

Still another and more specific object of the present invention is to provide a magnetic head in which thin-film element parts having a uniform construction can be produced.

The aforementioned objects of the present invention can be achieved by a magnetic head in which a thin-film element part for writing and reading information is formed on an end of a slider that floats over a recording medium, and a protective film is formed on the thin-film element part, air exiting the space between the head and the disk at the end of the slider, wherein a top surface of the protective film is provided with a recess extending from the neighborhood of the thin-film element part to an end of the protective film at which end air exits the space between the head and the disk.

In a preferred embodiment of the present invention, the recess extending from the neighborhood of an air-exiting end of the thin-film element part has a step-like cross section, a tapering cross section or a curved cross section.

According to the present invention, the swelling, induced by the temperature rise, of the protective film above a determined level of the surface facing the disk is prevented, by forming a recess in the protective film provided on the surface of the slider, which surface faces the disk. Hence, it is possible to achieve a small clearance of the magnetic head with respect to the recording medium.

The aforementioned objects of the present invention can also be achieved by a magnetic head manufacturing method for manufacturing a magnetic head in which a thin-film element part for writing and reading information is formed on an end of a slider that floats over a recording medium, air exiting at the end, the manufacturing method comprising the steps of: forming the thin-film element part on a wafer by forming a coil, magnetic films, gaps for writing and reading information, the length of the slider corresponding to the thickness of the wafer, forming a protective film on the upper magnetic pole, forming, near the gaps, grooves having a predetermined configuration to serve as recesses of the protective film, and cutting the wafer across its thickness so as to produce individual thin-film element parts.

Alternatively, the thin-film element part includes a magnetoresistant element having conductive members connected to the ends thereof.

In a preferred embodiment, the grooves are formed by etching or by a cutting tool having a predetermined cross section.

According to the present invention, it is easy to form grooves serving as recesses of the protective film by etching gap portions formed between two magnetic poles of the thin-film element part or by applying a cutting tool thereto. The wafer, which is formed with the thin-film element part is then cut. It is not necessary to perform a sophisticated chamfering process. It is also possible to substantially reduce a magnetic pole gap or a distance between the end face and the end of the protective film, thereby reducing variation in the quality of the thin-film element part. Thus, thin-film element parts having a uniform construction can be produced so that the electromagnetic transducing characteristic can be maintained uniform.

The aforementioned objects of the present invention can also be achieved by a magnetic head in which a thin-film element part for writing and reading information is formed on an end of a slider that floats over a recording medium, and a protective film is formed on the thin-film element part, air exiting at the end of the slider, wherein a side surface of the protective film is provided with a recess extending from the neighborhood of the thin-film element part to an end of the protective film, at which end air exits.

Preferably, the recesses of the magnetic head have a cross section of a step or a letter V.

According to the present invention, by providing each side surface of the protective film with recesses having a cross section of a step or a letter V and extending from the neighborhood of the thin-film element part to the end of the protective film, at which end air exits, the surface area near the protective film is increased, the cooling effect is enhanced so that only a small degree of swelling, induced by the temperature rise, of the protective film occurs, and it is possible to achieve a small clearance of the magnetic head with respect to the recording medium.

The aforementioned objects of the present invention can also be achieved by a magnetic head, wherein the thin-film element part is constructed of an electromagnetic induction element, or of a combination of an electromagnetic induction element and a magnetoresistant element.

Either construction of the thin-film element part ensures that a small clearance with respect to the recording medium is achieved, and the electromagnetic transducing characteristic exhibited during the recording/reproduction operation is improved.

The aforementioned objects of the present invention can also be achieved by a magnetic disk apparatus comprising: a head supporting part for carrying a magnetic head for writing and reading information to enable it to float over a recording medium; an arm part on which the head supporting part is fitted; and a driving part for moving the arm part over the recording medium.

By mounting the magnetic head of the present invention on the magnetic disk apparatus, chances of the magnetic head contacting the recording medium are reduced, and it is possible to achieve a small clearance. It is also possible to set a gap between the magnetic head and the recording medium at a small magnitude so that the reproduction output can be more efficiently obtained. It is also to be noted that the smaller gap results in an apparatus of a smaller scale.

BRIEF DESCRIPTION OF THE DRAWINGS

Other objects and further features of the present invention will be apparent from the following detailed description when read in conjunction with the accompanying drawings, in which:

FIG. 5 explains a relationship between a temperature rise in the magnetic head according to the first embodiment and a decrease in a recess amount;

FIG. 7 explains a relationship between a length of a non-tapered portion and the recess amount under different temperature rise conditions;

DESCRIPTION OF THE PREFERRED EMBODIMENTS

Figure 3A:
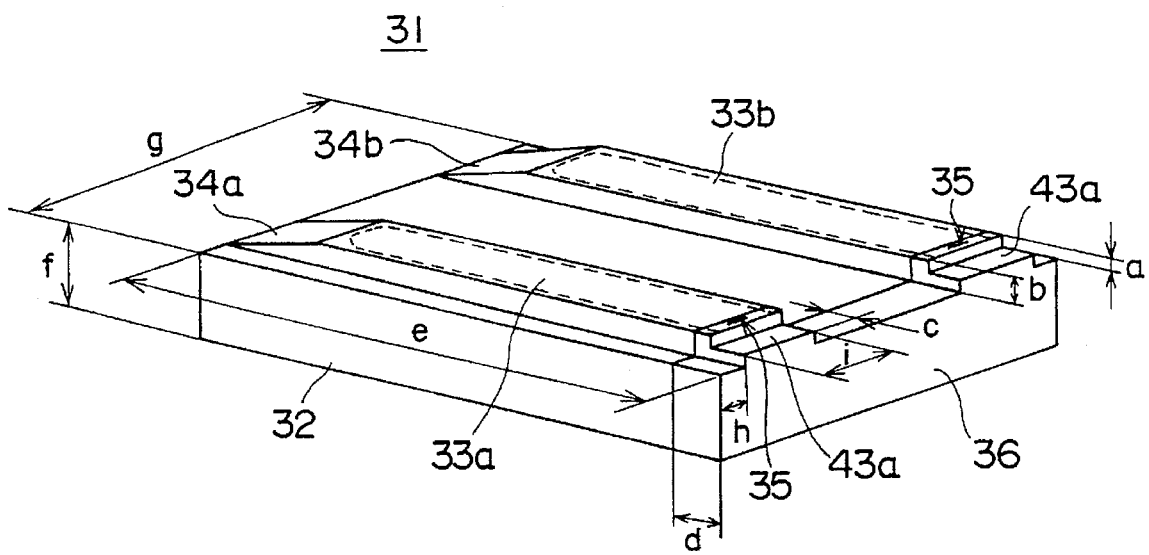
FIGS. 3A and 3B show a construction of a magnetic head of a first embodiment of the present invention.
Figure 3B:
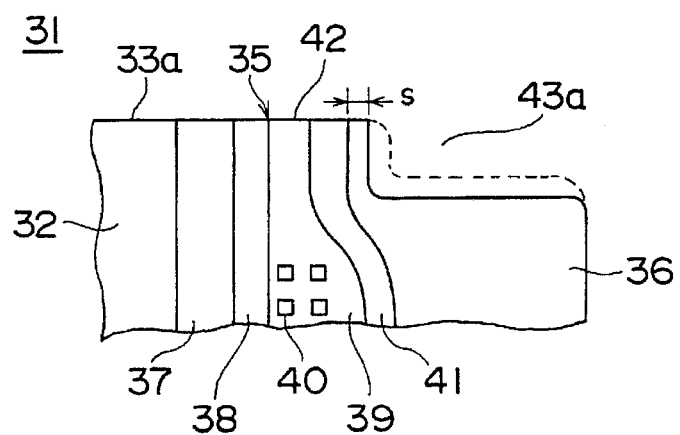

FIGS. 3A and 3B show a construction of the magnetic head of a first embodiment of the present invention. Referring to FIG. 3A, two rail surfaces 33a and 33b are formed on the surface of a core slider 32 of a magnetic head 31 which surface faces a magnetic disk (recording medium). The rail surfaces 33a and 33b are made to extend in the direction in which air flows. Tapered surfaces 34a and 34b for allowing the head to float are formed on an end of the core slider 32 at which end air is introduced into the space between the head and the disk.

On one end of each of the rail surfaces 33a and 33b, at which end air exits, a thin-film element 35 for writing and reading information and a protective film 36 are provided. As shown in FIG. 3B, the thin-element 35 is formed such that an insulating film 37 is formed on the end face of the core slider 32 (rail surfaces 33a and 33b), and a magnetic film 38 serving as a magnetic pole is formed on the insulating film 37. An insulating film 39 is formed on the magnetic film 38, and a coil 40 having a predetermined number of turns is provided in the insulating film 39.

A magnetic film 41 serving as a magnetic pole is provided on the insulating film 39. Recording and reproduction are performed in a gap 42 formed between the magnetic film 38 and the magnetic film 41. A protective film (insulating film) 36 is formed on the magnetic film 41 in the thin-film element 35.

A step-like recess 43a is formed in each of the rail surfaces 33a and 33b, respectively, near the thin-film element 35 so as to extend longitudinally toward an end of each of the rail surfaces at which air exits. A distance S (FIG. 3B) between the magnetic film 41 and the end of the protective film 36 is set such that S is as close as possible to zero, and at least smaller than 0.015 mm.

The rail surfaces 33a and 33b are chamfered (applied with a lapping process) as indicated by broken lines in FIG. 3A so as to allow air to flow smoothly and to reduce the amount of powder created when the disk comes into contact with the head and is thus abraded.

While the thin-film elements 35 is formed on the end face of both the rail surfaces 33a and 33b, only one of the elements 35 is driven during a normal operation. This is to ensure that the thin-film elements 35 of the magnetic heads 31 over the respective surfaces of the magnetic disk are aligned. Alternatively, only one element may be provided at the center of the end of the core slider.

Typically, as indicated in FIGS. 3A, the dimensions of the magnetic head of FIG. 3 are: a≧0.03 μm; b=0.045 mm; c=25 μm; d=40 μm; e=2 mm; f=1.6 mm; g=0.385 mm; h=0.054 mm; and i=0.255 mm. Alternatively, the dimensions may be set such that 0.01 mm ≦c≦0.25 mm, and L≧0.02 mm.

The chamfering of the protective film in which a recess is provided will be discussed below.

Figure 4A:
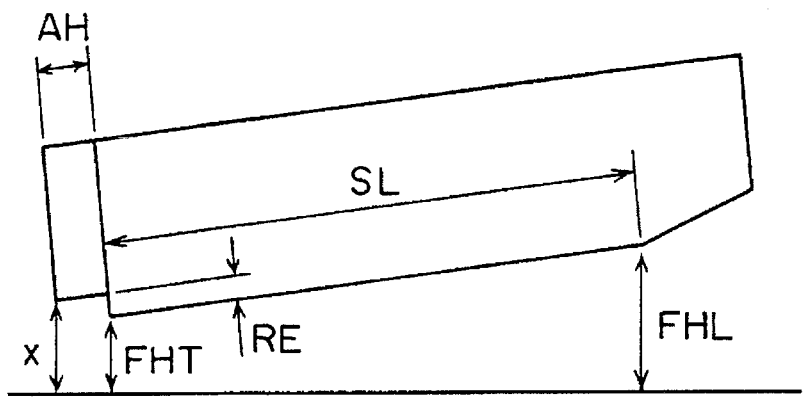
FIGS. 4A and 4B show a relative position of a magnetic head according to the first embodiment with respect to a recording medium.
Figure 4B:
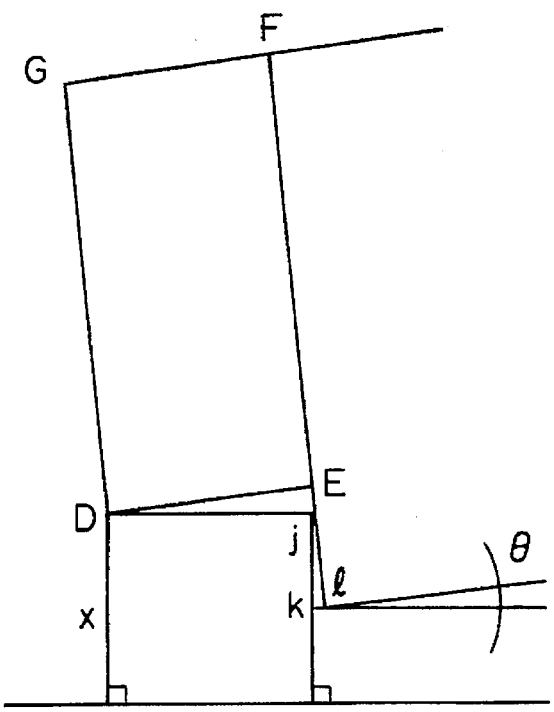

FIG. 4A is a schematic diagram showing the relative position of the magnetic head according to the first embodiment with respect to the recording medium. FIG. 4B is an enlarged view of the end of the magnetic head at which end air exits. The dimension indicated in FIG. 3A as is indicated as RE in FIG. 4A. Desirably, RE has a value of 0.03 μm or greater.

Referring to FIG. 4A, FHT indicates a distance between the recording medium and the magnetic head, FHL indicates a distance between the air-entering end of the flat part of the core slider and the recording medium, SL indicates a length, as measured in the longitudinal direction, of the rail surfaces 33a and 33b, and AH indicates a thickness of the protective film, the length SL not including the tapered portion formed in the air-entering end of the core slider.

Referring to FIGS. 4A and 4B, x indicates a distance between the end of the protective film and the recording medium, and Θ indicates an inclination of the magnetic head. x and Θ are given by the following equations.

Θ=sin$^{-1}$ {(FHL−FHT)/SL} x=REcosΘ−AHsinΘ+FHT ($E_k$=RE cosΘ, $E_j$=AHsinΘ)

It is preferred that, if RE has a value smaller than 0.03 μm, the end of the protective film be chamfered. In other words, a taper may be formed at the end of the protective film.

It is assumed that a magnetic disk apparatus 1 has a magnetic head whose dimensions are; RE=0.02 μm, FHT= 0.1 μm, FHL=0.35 μm, SL=1.85×10$^3$ μm, AH=45 μm. The values of x and Θ in the apparatus 1 are as follows.

$$\begin{aligned}
\theta &= \sin^{-1}\{(FHL-FHT)/SL\} \\
&= \sin^{-1}\{(0.35-0.1)/(1.85\times 10^3)\} \\
&= 0.00774 \text{ [deg]} \\
x &= RE\cos\theta - AH\sin\theta + FHT \\
&= 0.02\cos\theta - 45\sin\theta + 0.1 \\
&= 0.11392 \text{ [μm]}
\end{aligned}$$

It is further assumed that a magnetic disk apparatus 2 has a magnetic head whose dimensions are; RE=0.01 μm, FHT= 0.07 μm, FHL=0.245 μm, SL=1.85×10$^3$ μm, AH=45 μm. The values of x and Θ in the apparatus 2 are as follows.

$$\begin{aligned}
\theta &= \sin^{-1}\{(FHL-FHT)/SL\} \\
&= \sin^{-1}\{(0.245-0.07)/(1.85\times 10^3)\} \\
&= 0.00542 \text{ [deg]} \\
x &= RE\cos\theta - AH\sin\theta + FHT \\
&= 0.01\cos\theta - 45\sin\theta + 0.07 \\
&= 0.07574 \text{ [μm]}
\end{aligned}$$

When an element in a magnetic disk apparatus is energized, the temperature of the coil rises, and the protective film is made to swell toward the medium accordingly. FIG. 5 explains a variation of a difference (hereinafter, referred to as a recess amount) between x and FHT under different temperature rise conditions. A negative recess amount indicates that the end of the protective film is nearer the medium than the FHT gap is. It will be learned from FIG. 5 that, for each temperature rise of 10° C., the recess amount decreases by about 6 nm. When the temperature rise is equal to 50° C., the end of the protective film is nearer the medium than the FHT gap by a margin of 25 nm. It is determined from this that, if the length GD indicated in FIG. 4B is reduced by about 30 nm, the projection of the protective film beyond the FHT gap is prevented.

Figure 6A:
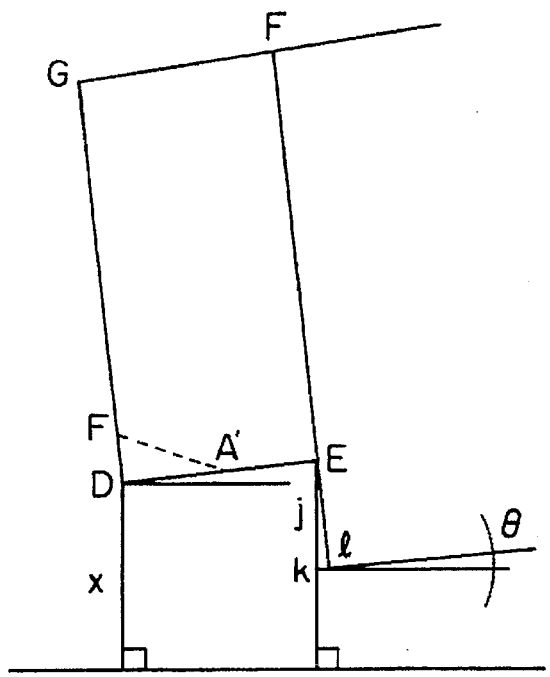
FIGS. 6A and 6B are schematic diagrams showing the relative position of the magnetic head according to a variation of the first embodiment with respect to the recording medium.
Figure 6B:
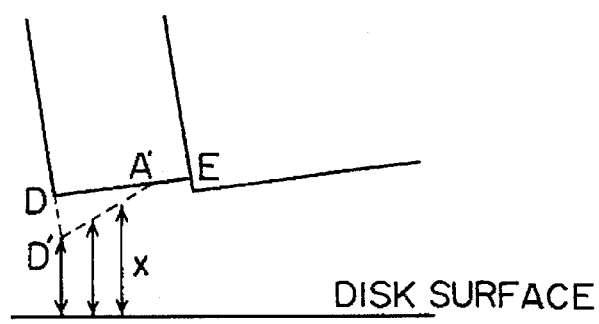

In order to prevent the projection of the protective film beyond the recording gap, a taper must be formed at the end of the protective film. FIGS. 6A and 6B are schematic diagrams showing the relative position of the magnetic head according to a variation of the first embodiment with respect to the recording medium. A broken line in FIG. 6A indicates a taper. A point D' in FIG. 6B indicates the end of the swollen protecting film. Assuming that DE is 1, four cases of taper formation will be considered.

Case 1: AE=0.8

Case 2: AE=0.6

Case 3: AE=0.4

Case 4: AE=0.2

Theoretically, on the basis of the similarity between a triangle A'FD and a triangle A'D'D, it will be determined that the degree of swelling of the protective film is in inverse proportion to a ratio of A'E to DE. That is, the shorter the length A'E, the smaller the degree of swelling of the protective film.

FIG. 7 explains a relationship between the length (A'E) of a non-tapered portion and the recess amount under different temperature rise conditions. FIG. 7 indicates that, for each temperature rise of 10° C., the recess amount decreases by about 6 nm. A shaded range in FIG. 7 indicates a range in which the protective film has a wider clearance than the recording gap with respect to the recording medium.

Figure 8:
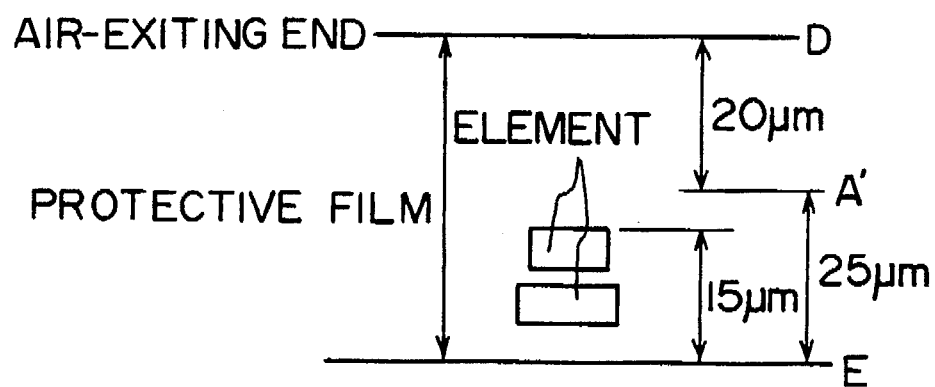
FIG. 8 is a bottom view of the magnetic head.

Assuming that the temperature rise due to the energization of the element is 30° C. at the most, a taper formation resulting in the length A'E of 25 μm gives a satisfactory performance of the magnetic head. FIG. 8 is a bottom view of the magnetic head when A'E=25 μm.

Figure 9:
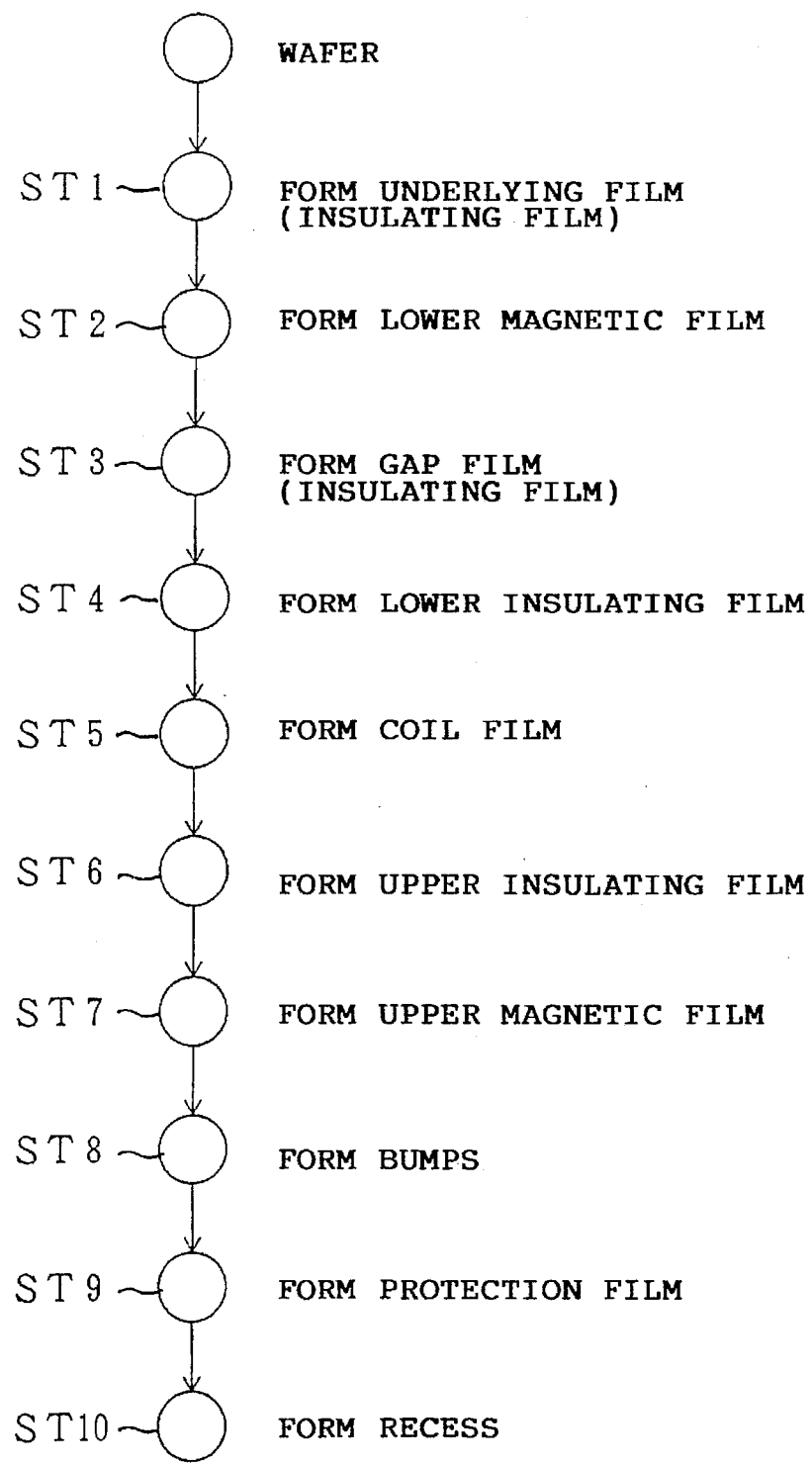
FIG. 9 is a chart explaining a wafer process for producing a thin-film element.
Figure 10A:
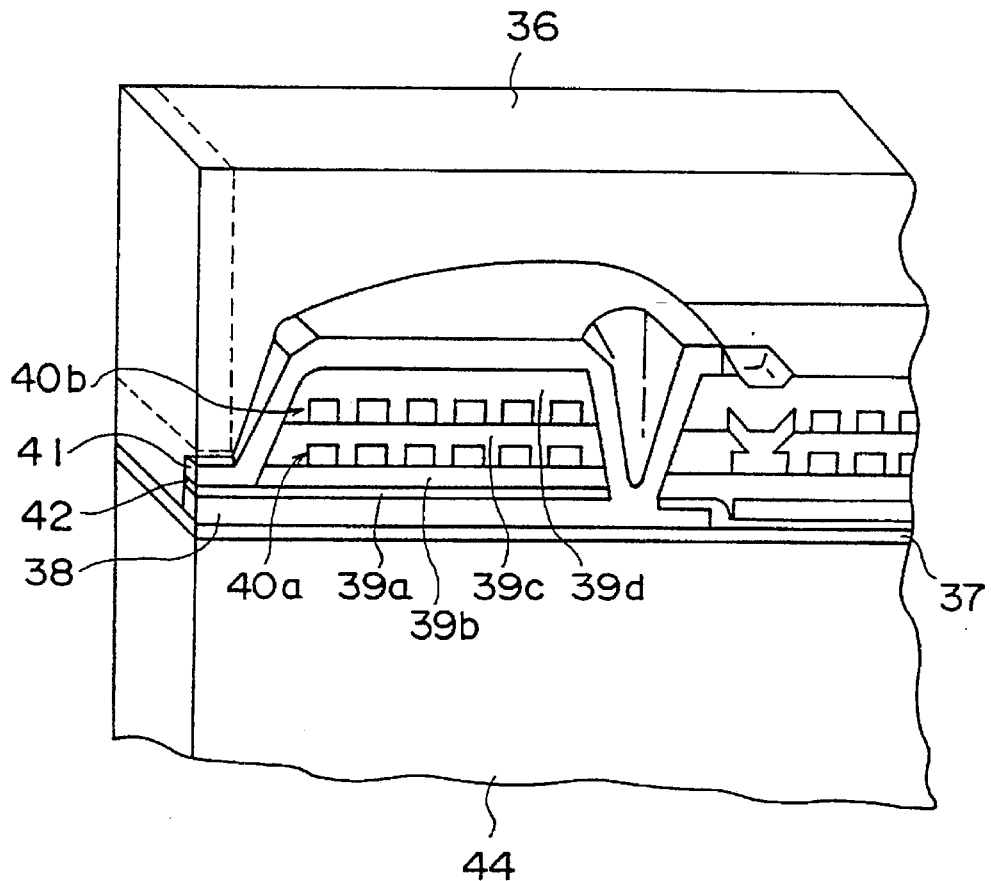
FIGS. 10A and 10B show parts of a thin-film element.
Figure 10B:
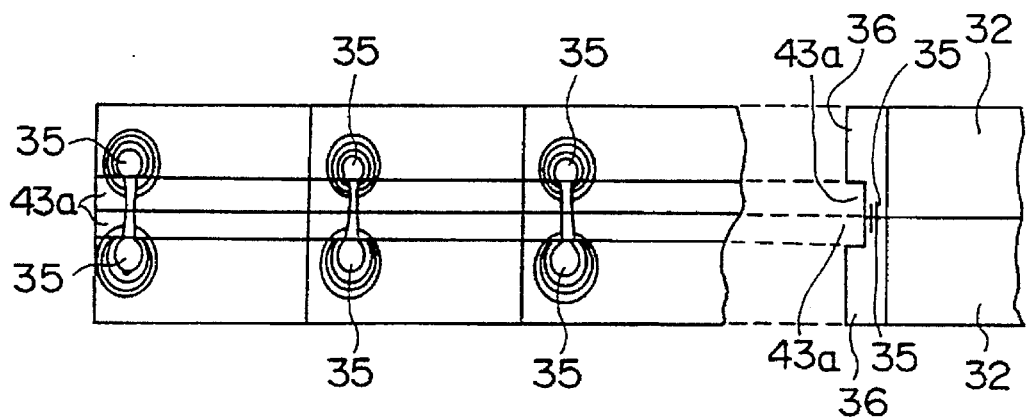

FIG. 9 explains a wafer process for producing a thin-film element, and FIGS. 10A and 10B show parts of the thin-film element. Referring to FIG. 9 and FIGS. 10A/10B, the insulating film 37 is formed, by alumina sputtering, on the surface of a wafer 44 as an underlying film, the thickness of the wafer 44 corresponding to the length of the core slider 32 (ST 1). The lower magnetic film 38 is formed on the insulating film 37 by a subsequent chromium plating process and an etching process (ST 2).

The number of the magnetic films 38 formed depends on the number of thin-film elements 35 formed in the wafer 44. The gaps 42 formed in the magnetic film 38 are linearly arranged.

Subsequently, a gap film 39a is formed on the magnetic film 38 by alumina sputtering and milling (ST 3). A lower insulating film 39b is formed on the gap film 39a by alumina photo etching (ST 4). A coil film 40a is formed on the lower insulating film 39b by chromium sputtering and photo etching (ST 5). When the coil 40 is formed of two layers, an insulating film 39c is formed after ST 4 and ST 5, and lastly an upper coil film 40b is formed. An upper insulating film 39d is formed on the upper coil film 40b by alumina photo etching (ST 6).

An upper magnetic film 41 is formed on the upper insulating film 39d by chromium plating and etching (ST 7). The gap 42 is formed between the upper magnetic film 41 and the lower magnetic film 38, in which gap the gap film 39a is formed.

Bumps serving as lead connecting parts of the magnetic films 38 and 41, and coil films 40a and 40b are formed by chromium sputtering or the like (ST 8). Thus, the thin-film element 35 is completed. The protective film 36 is formed on the entirety of the thin-film element 35 by alumina sputtering (ST 9).

The recess 43a (a broken line in FIG. 10A) is formed by etching the protective film 36 or by grinding the same with a grindstone or the like (ST 10; see FIG. 10B).

Figure 11A:
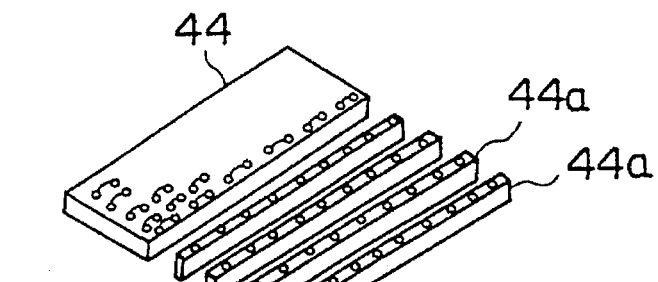
FIGS. 11A, 11B, 11C and 11D explain a fabrication process of the magnetic head and the building of a head assembly.
Figure 11B:
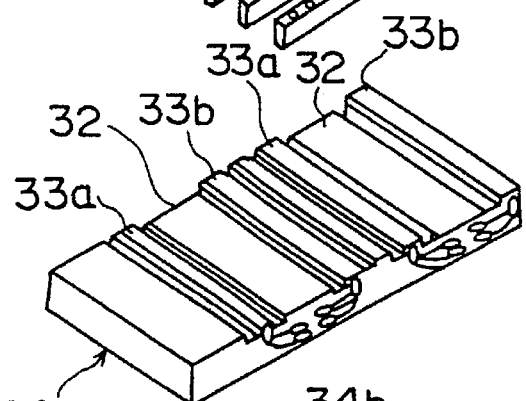
Figure 11C:
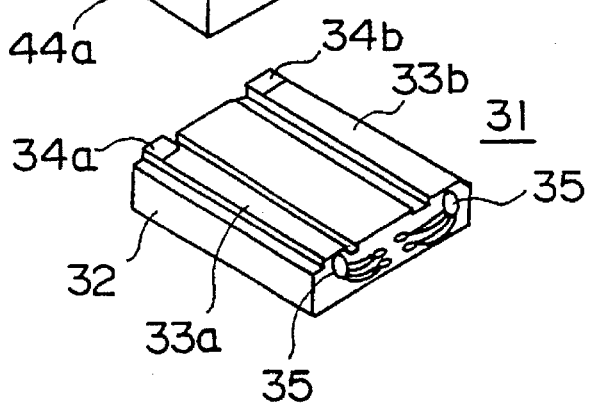
Figure 11D:
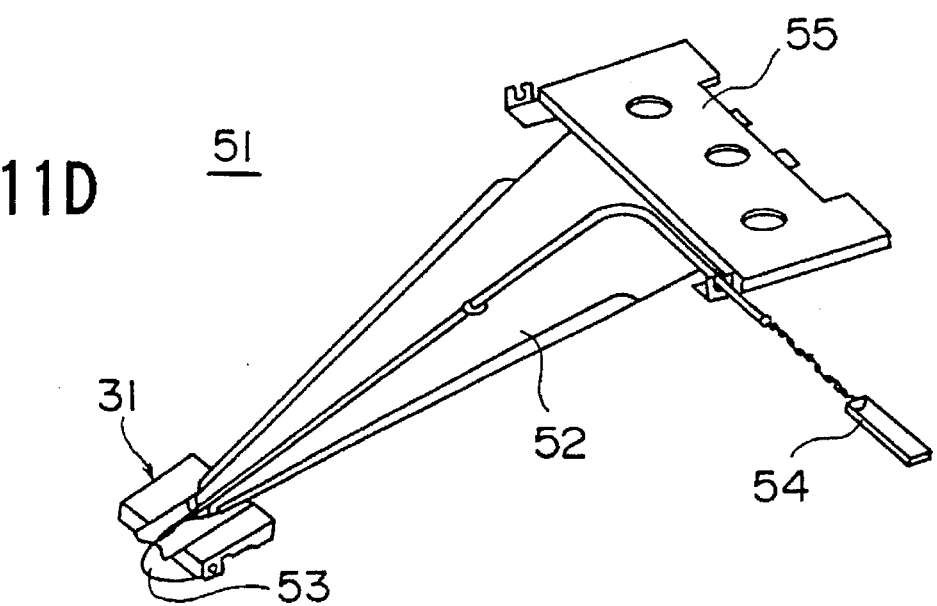
Figure 12A:
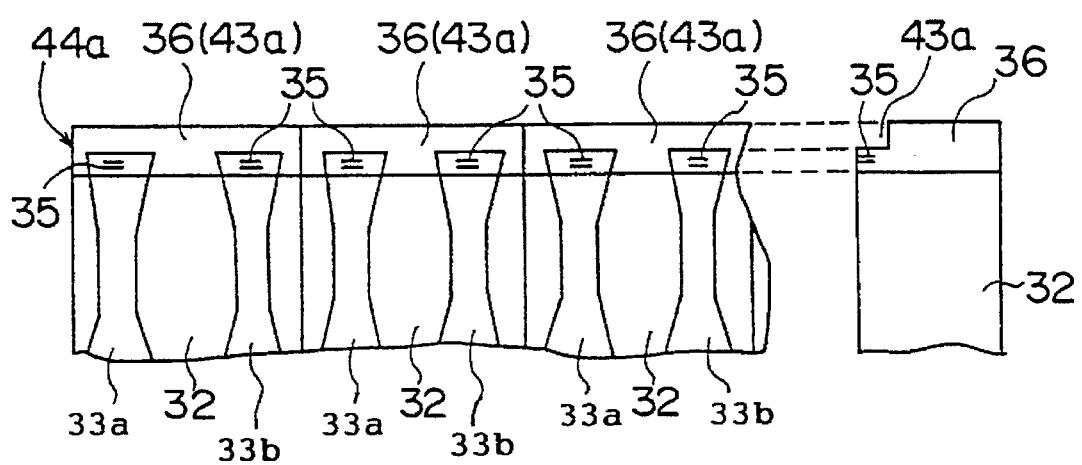
FIGS. 12A and 12B show a part of the wafer in which the thin-film element is formed.
Figure 12B:
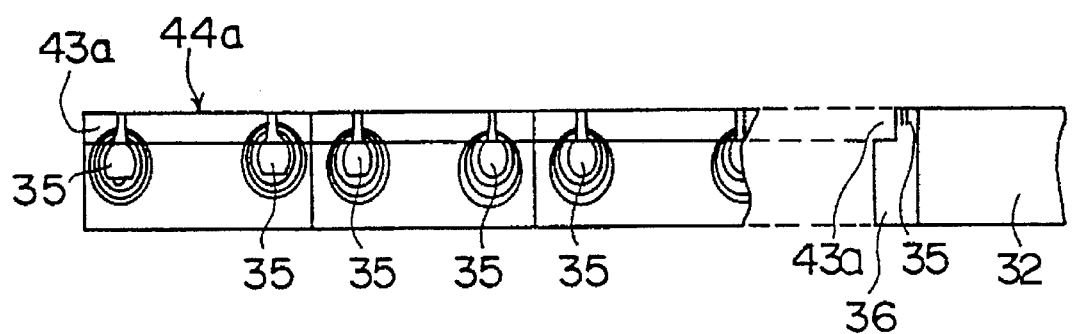

FIGS. 11A, 11B, 11C and 11D explain a fabrication process of the magnetic head and the building of a head assembly, and FIGS. 12A and 12B show a part of the wafer in which the thin-film element is formed.

Referring to 11a, 11B, 11C and 11D, the wafer 44, in which the thin-film element 35 and the protective film 36 (recess 43a) are formed, is cut along a line along which pairs of the gaps 42 of the thin-film element 35 face each other so that a cut wafer piece 44a is produced (FIG. 11A). In the cut wafer piece 44a, the rail surfaces 33a and 33b are formed by grinding (FIG. 11B).

FIGS. 12A and 12b show the cut wafer piece 44a in the state described above. FIG. 12A is a plan view of the wafer piece 44a showing the rail surfaces 33a and 33b, and FIG. 12B is a plan view of the wafer piece 44a showing the end face thereof at which air exits. As shown in FIGS. 12A and 12B, the wafer piece 44a, which has the recess 43a extending in the longitudinal direction, and in which the predetermined number of core sliders 32 are arranged, is cut grounded so that the rail surfaces 33a and 33b having a predetermined height are formed.

Referring to FIGS. 11A, 11B, 11C and 11D, the cut wafer piece 44a, in which the rail surfaces 33a and 33b are formed, is cut to produce the individual magnetic heads 31 (core sliders 32). The tapered surfaces 34a and 34b are formed at respective ends of the rail surfaces 33a and 33b, at which ends air is introduced. As mentioned earlier, chamfering of the rail surfaces 33a and 33b is performed (FIG. 11C).

A head assembly 51 is built such that the magnetic head 31 thus formed is mounted on a gimbal 52 (head supporting part) that supports the head (FIG. 11D). Leads 53 from the aforementioned bumps of the thin-film element 35 of the magnetic head 31 are connected to a connecting terminal 54. The head assembly 51 is mounted on a carriage arm described later via a mounter 55.

Figure 13:
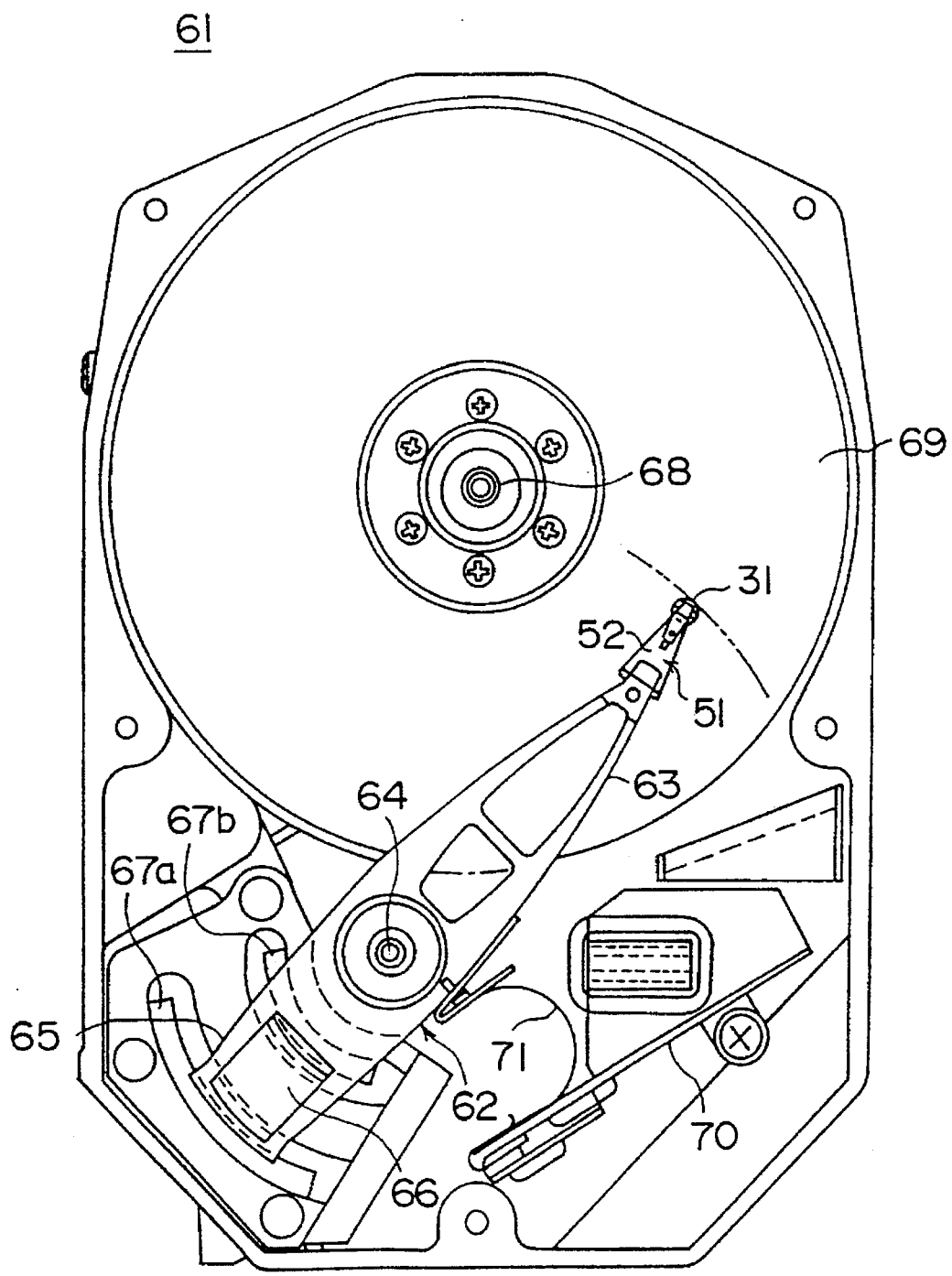
FIG. 13 is a plan view showing a construction of a magnetic disk apparatus in which the magnetic head of FIGS. 3A and 3B is used.

FIG. 13 is a plan view showing a construction of a magnetic disk apparatus 61 in which the magnetic head of FIGS. 3A and 3B is used. In the magnetic disk apparatus 61 shown in FIG. 13, the head assembly 51 is fitted on an arm 63 of an actuator 62, the base of the arm 63 being rotatably supported by a pivot 64.

At a position on the arm 63 further away from the head assembly 51 than that of the pivot 64, there is provided a rotatably supporting part 65, a coil 66 being wound in the rotatably supporting part 65. Two magnets 67a and 67b are fixed under the coil 66. The coil 66 and the magnets 67a and 67b constitute a VCM (voice coil motor) for driving the head.

The actuator 62 of the above construction functions such that the arm 63 is rotated so as to move the magnetic head 31 in a radial direction of a magnetic disk 69 by feeding a current from a wiring substrate 70 to the coil 66 via a flexible printed board 71, the magnetic disk 69 being fixed to a spindle 68 of a spindle motor (not shown) of a sensorless type.

In the magnetic disk apparatus 61 described above, the actuator 62 positions the magnetic head 31 over a predetermined track of the magnetic disk 69 so that the head writes information to the disk or read information therefrom. This positioning is achieved by feeding a current to the coil 40 (coil films 40a, 40b) of the thin-film element 35. When the current is fed to the coil 40, the temperature of the thin-film element 35 rises, resulting in a thermal expansion and a resultant swelling of the protective film 36. However, as indicated by a broken line in FIG. 3B, the swelling takes place in the recess 43a. Hence, only a small degree of swelling occurs near the gap 42. It was experimentally found that the swelling, with reference to an interval having the distance S shown in FIG. 3B, of the protective film 36 measured 2 nm (6 nm in the conventional technology) per a temperature rise of 10° C.

Accordingly, it is possible to reduce the chances of contact between the surface of the magnetic disk 69 and the magnetic head 31, with the result that the damage to the magnetic head 31 (thin-film element 35) due to the attachment of abrasion powder thereto is diminished, and the reliability of the apparatus is increased. Consequently, the magnetic head 31 is allowed to approach the surface of the magnetic disk 69 more closely during the operation, that is, a small clearance can be achieved. Moreover, the recess 43a can be easily formed in the wafer that is being processed during production of the magnetic head 31. The presence of the recess 43a reduces the distance between the gap 42 and the end of the protective film 36, thereby affecting the thin-film element 35 less unfavorably than when a recess is formed by chamfering the rail surfaces 33a and 33b according to the conventional process. As a result, variation in the quality of the magnetic head produced can be decreased.

The recess 43a also reduces the chances of the edge of the magnetic head 31 coming into contact with the magnetic disk 69 due to rolling of the magnetic head 31.

Figure 14A:
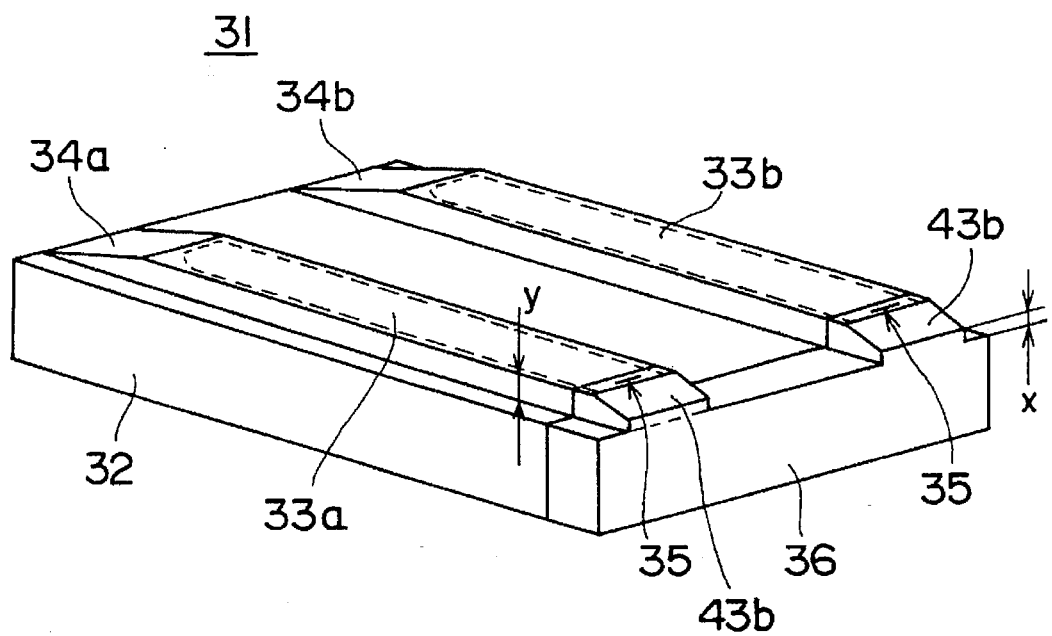
FIGS. 14A and 14B show a construction of a magnetic head of a second embodiment.
Figure 14B:
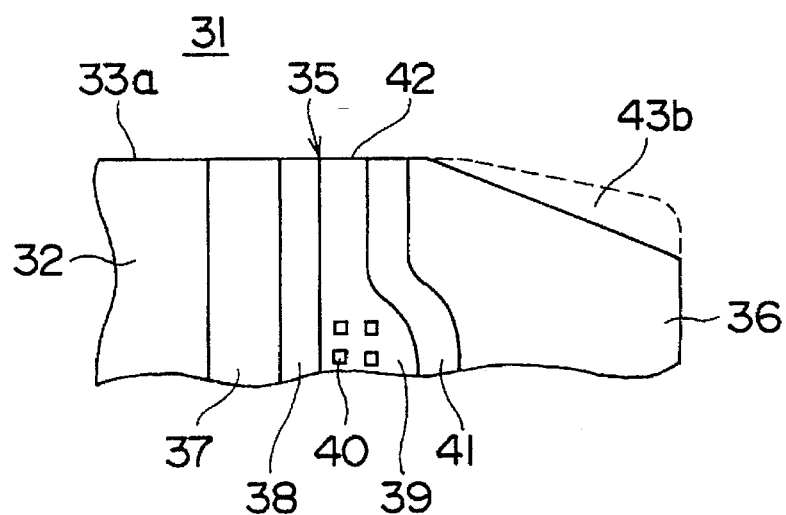

FIGS. 14A and 14B show a construction of the magnetic head according to a second embodiment of the present invention. The magnetic head 31 shown in FIGS. 14A and 14B is constructed such that a tapering recess 43b is formed in each of the rail surfaces 33a and 33b (surfaces which face the disk) of the core slider 32, near the thin-film element 35, the tapering recess 43b extending longitudinally toward an end of each of the rail surfaces at which air exits. The remaining aspects of the construction are the same as those of the first embodiment and have the same effect. The magnetic head 31 shown in FIGS. 14A and 14B is mounted on the magnetic disk apparatus 61 shown in FIG. 11. Typically, the dimension indicated by x is approximately 0.020 mm, and the dimension indicated by y is 0.045 mm.

Figure 15A:
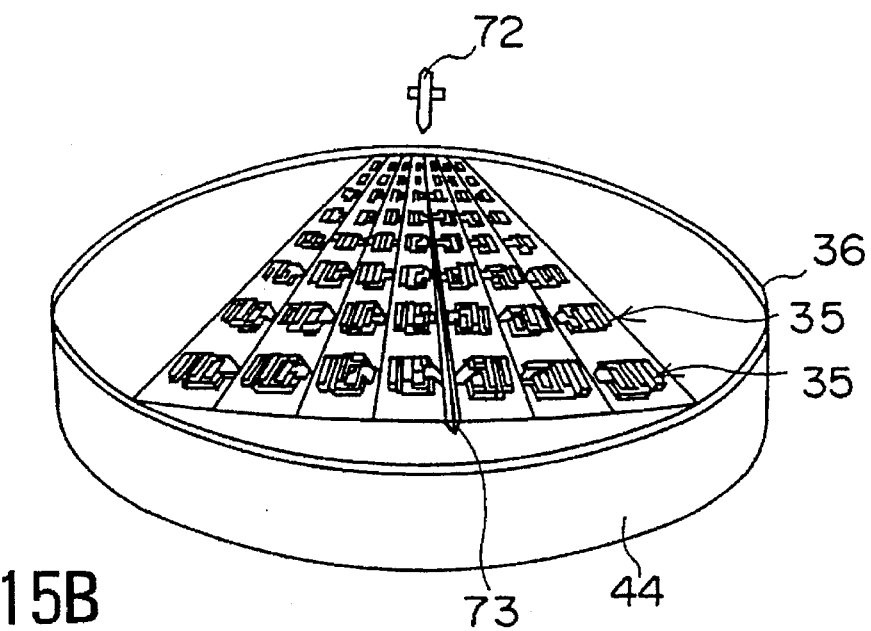
FIGS. 15A and 15B explain production of the magnetic head of the second embodiment.
Figure 15B:
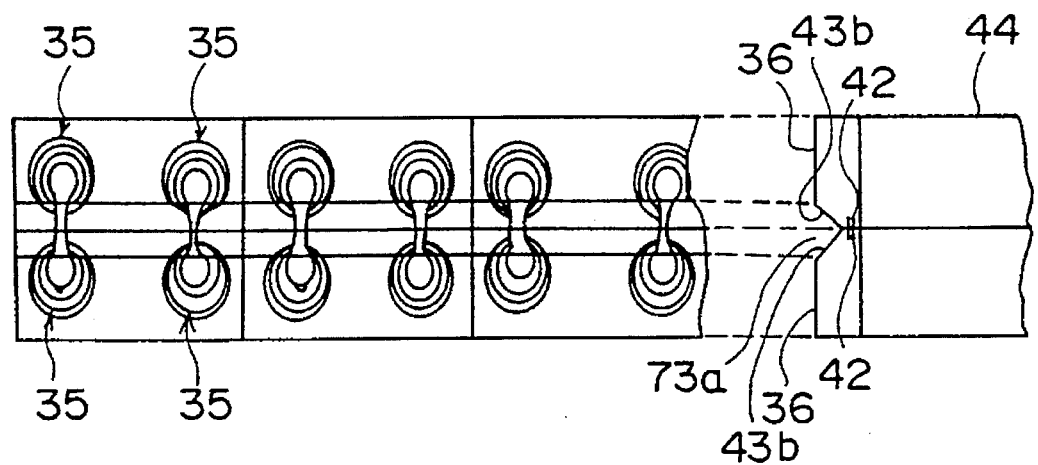

FIGS. 15A and 15B explain how the magnetic head 31 of the second embodiment is produced. Referring to FIGS. 15A and 15B, a predetermined number of the thin-film elements 35 are produced on the wafer 44, similarly to the method explained in FIG. 9, and the protective film 36 is formed on the thin-film elements 35. Thereafter, a groove 73a having a cross section of a letter V is formed near the gap 42 of each of the thin-film elements 35 by means of a blade (grindstone or the like) having a V-shaped cross section. For example, the wafer is fixed on a stage, whereupon a grindstone held by a robot hand is moved, in the transversal direction, and positioned at a part of each block of the wafer, at which part the thin-film element is formed, the positioning being done by sensing marks. The grindstone is driven in the longitudinal direction of the wafer so as to form the groove 73a.

By cutting the wafer 44 along the groove 73a having a cross section of a letter V, the tapering recess 43b as shown in FIGS. 14A and 14B is formed to extend from the neighborhood of the thin-film element 35 to the protective film 36.

Thus, the tapering recess 43b can be easily formed in the wafer that is being processed by the blade 72.

In this construction, when the magnetic head 31 is driven by feeding a current to the coil, the temperature may rise and the protective film 36 undergo a thermal expansion. However, only a small degree of swelling of the protective film 36 on the rail surfaces 33a and 33b (the gap 42) results, as indicated by a broken line in FIG. 14B. Therefore, it is possible to achieve a small clearance of the magnetic head 31.

Figure 16A:
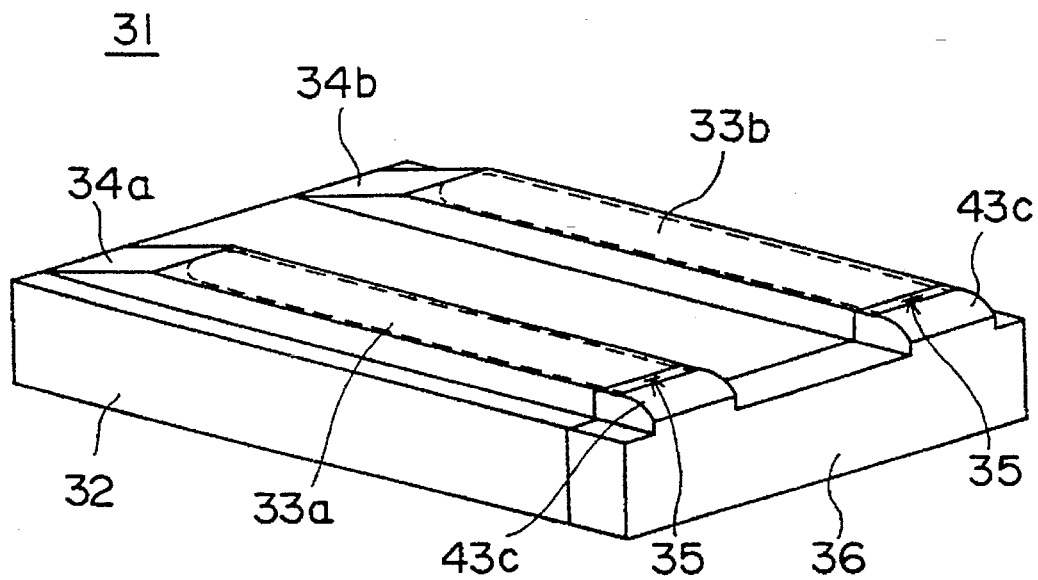
FIGS. 16A and 16B show a construction of a magnetic head of a third embodiment.
Figure 16B:
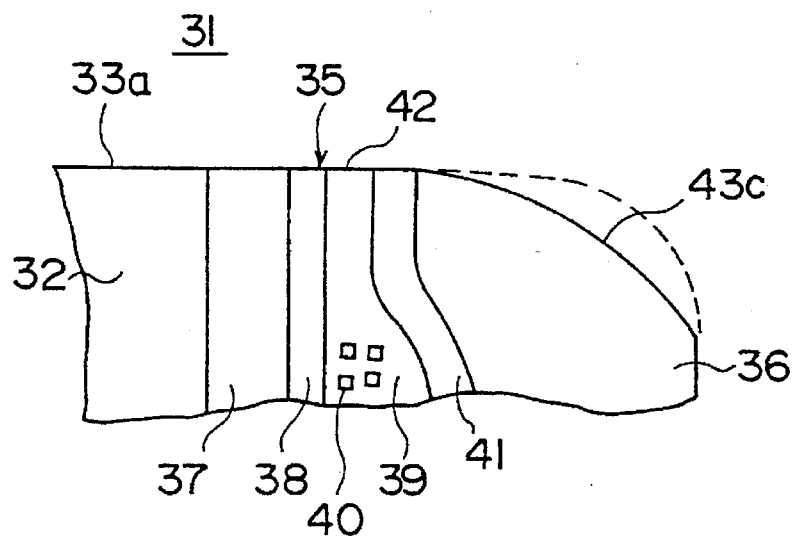
Figure 17:
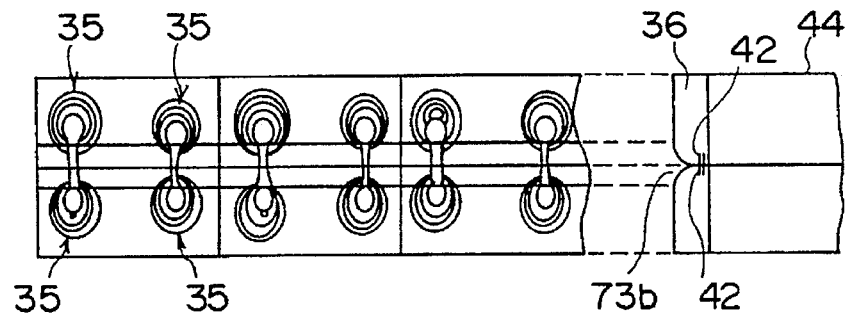
FIG. 17 explains a shape of a groove of the magnetic head of the third embodiment.

FIGS. 16A and 16B show a construction of the magnetic head of a third embodiment of the present invention, and FIG. 17 explains a shape of a groove of the third embodiment. The magnetic head 31 shown in FIGS. 16A and 16B is constructed such that a curved recess 43c is formed in each of the rail surfaces 33a and 33b (surfaces which face the disk) of the core slider 32, near the thin-film element 35, the curved recess 43c extending longitudinally toward an end of each of the rail surfaces at which air exits. The remaining aspects of the construction are the same as those of the first embodiment and has the same effect. The magnetic head 31 shown in FIGS. 16A and 16B is mounted on the magnetic disk apparatus 61 shown in FIG. 13.

As shown in FIG. 17, a groove 73b having a cross section of an inverted letter R is formed by a blade having a curved cross section, near the gap 42 of each thin-film element 35. By cutting the wafer along the center line of the groove 73b, the recess 43c having a cross section of an inverted letter R is formed in the protective film 36.

By forming the recess 43c, only a small degree of swelling of the protective film 36 on the rail surfaces 33a and 33b (the surfaces that face the disk) due to a thermal expansion results, as indicated by a broken line in FIG. 16B. Therefore, it is possible to achieve a small clearance of the magnetic head 31.

Figure 18A:
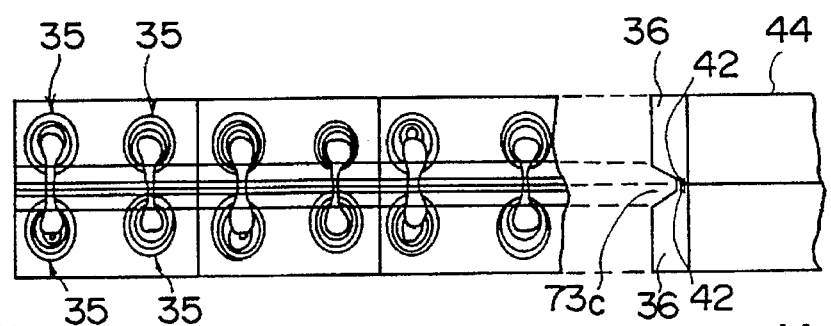
FIGS. 18A and 18B explain other shapes of the groove of the first through third embodiments.
Figure 18B:
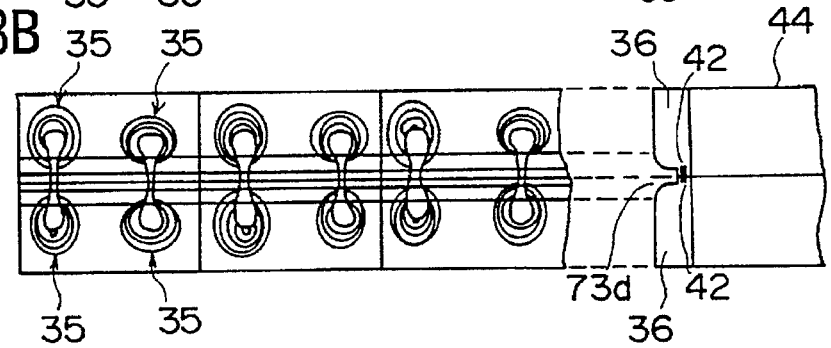

FIGS. 18A and 18B explain other possible configurations of the groove in the first through third embodiments. FIG. 18A shows a case where a blade having a cross section of an inverted trapezoid is applied to the wafer being processed so as to form a groove 73c having a cross section of an inverted trapezoid, near the gap 42 of the thin-film element 35. By cutting the wafer along the center line of the groove 73c having a cross section of an inverted trapezoid, a tapering recess is formed in the protective film 36.

FIG. 18B shows a case where a blade is applied to the wafer being processed so as to form a groove 73d having a flat bottom and a cross section of an inverted letter R, near the gap 42. By cutting the wafer at the center line of the groove 73d, the recess having a cross section of an inverted letter R is formed in the protective film 36.

Figure 19A:
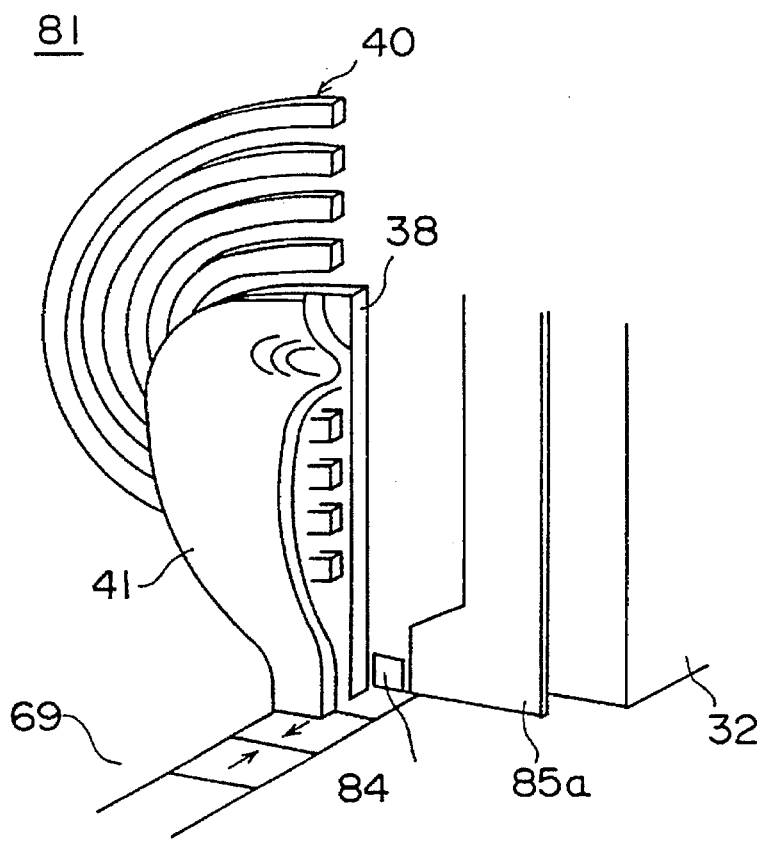
FIGS. 19A and 19B are schematic diagrams of a construction in which a magnetic head is constructed of a thin-film MR element.
Figure 19B:
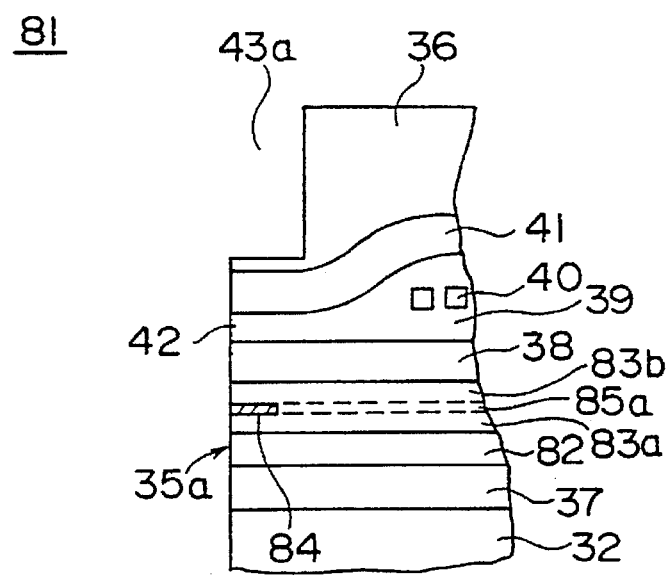

FIGS. 19A and 19B show a construction of the magnetic head in which a thin-film MR element is used. FIG. 19A shows a construction of a part of the magnetic head, FIG. 19B being a partial cross sectional view thereof. A magnetic head 81 shown in FIGS. 19A and 19B is configured such that the insulating film 37 of alumina or the like is formed as an underlying layer on the core slider 32, a shield film 82 (magnetic film) of FeMn (manganese iron) or the like is formed on the insulating film 37, and an insulating film 83a of alumina or the like is formed on the film 82.

An MR element (magnetoresistant element) 84 and conductive members 85a and 85b (the member 85b is not shown in the figure) connected to respective ends of the MR element 84 are formed on the insulating film 83a. An insulating film 83b is formed on the MR element 84 and the conductive members 85a and 85b.

The lower magnetic film 38 serving as a shield film is formed on the insulating film 83b. Similarly to the magnetic head of FIGS. 3A and 3B, the insulating film 39, the coil 40 and the upper magnetic film 41 are formed on the magnetic film 38. Thus, the thin-film element 35 is completed. The protective film 36 is formed on the thin-film element 35. The step-like recess 43a is formed on the protective film 36. The recess 43a may have a tapering or curved cross section.

In the magnetic head 81 of the above construction, the gap 42 in the thin-film element 35 serves as an element for recording information, and the MR element 84 serves as an element for reproducing information.

Thus, even in the case where the MR element 84 is used, the recess 43a formed in the protective film 36 reduces the chances of the magnetic head 81 coming into contact with the magnetic disk 69 when the temperature rises. Consequently, it is possible to achieve a small clearance of the magnetic head 81.

The MR element 84 may also be used in a fourth embodiment described below.

Figure 1A:
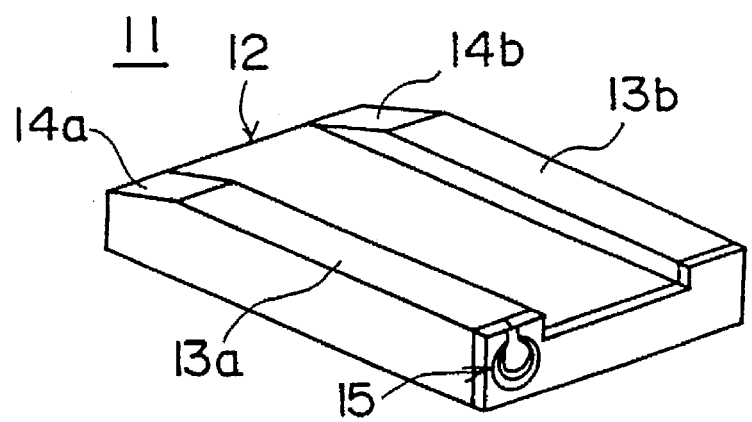
FIGS. 1A, 1B and 1C show a construction of a conventional magnetic head.
Figure 1B:
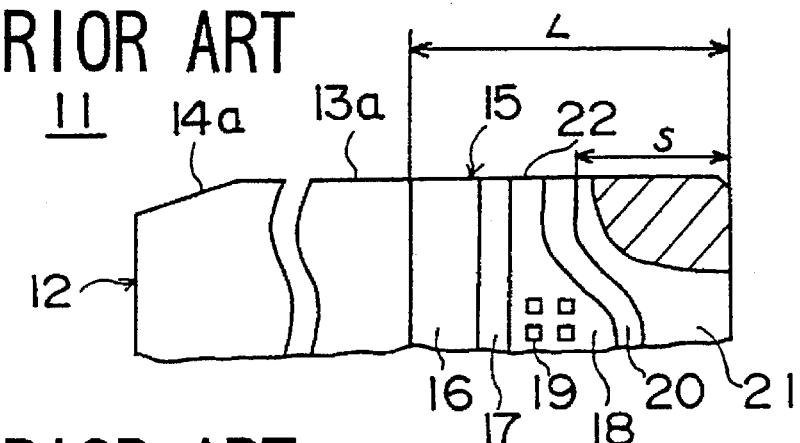
Figure 1C:
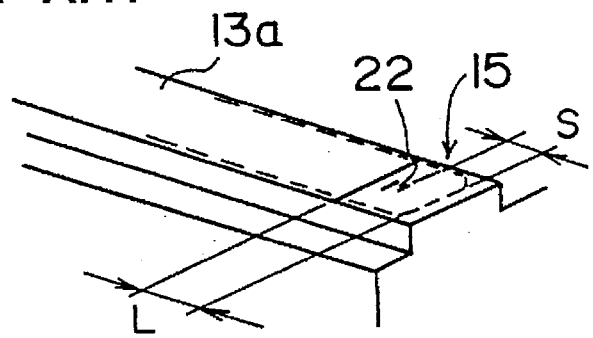
Figure 2:
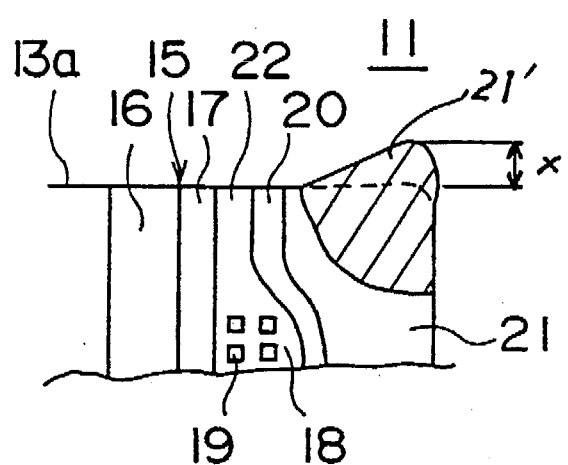
FIG. 2 explains thermal expansion of a protective film of a conventional magnetic head.
Figures 20A, 20B, 20C:
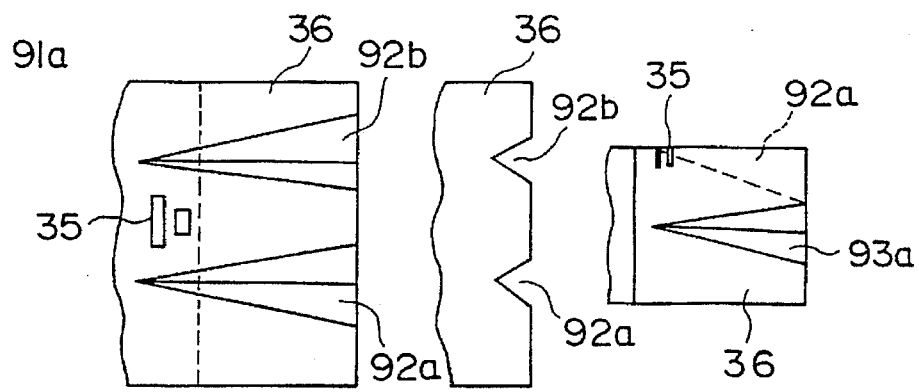
FIGS. 20A, 20B and 20C show a construction of a part of a magnetic head of a fourth embodiment of the present invention.

FIGS. 20A, 20B and 20C show a construction of a part of the fourth embodiment of the present invention. FIG. 20A is a plan view of the part including a thin-film element, FIG. 20B is a rear view of an end face of the protective film, and FIG. 20C is a side view of the part including the thin-film element. A magnetic head 91a shown in FIGS. 20A–20C has a construction similar to that shown in FIG. 1A. However, the protective film 36 is formed on the thin-film element 35, and two grooves 92a and 92b having a cross section of a letter V are formed to extend from the neighborhood of the thin-film element 35 to the end of the protective film 36, at which end air exits, the grooves 92a and 92b becoming increasingly deeper as they approach toward the end of the protective film 36. Further, as shown in FIG. 20C, two grooves 93a and 93b (the groove 93b is not shown in the figure) having a cross section of a letter V are formed at the respective sides of the end of the protective film 36 so as to extend toward the end of the protective film, at which end air exits, the grooves 93a and 93b becoming increasingly deeper as they approach toward the end of the protective film 36. A magnetic head 91a is mounted on the magnetic disk apparatus 61 shown in FIG. 13.

The above construction, in which the grooves 92a and 92b are formed on the surface of the protective film 36, which surface faces the disk, and the grooves 93a and 93b are formed on the sides of the protective film 36, ensures that the cooling effect is improved, that the surface area near the thin-film element 35 is increased, and that only a small degree of swelling, induced by the temperature rise, of the protective film 36 occurs in the surface thereof facing the disk. Accordingly, it is possible to achieve a small clearance of the magnetic head 91a with respect to the magnetic disk.

Figures 21A, 21B:
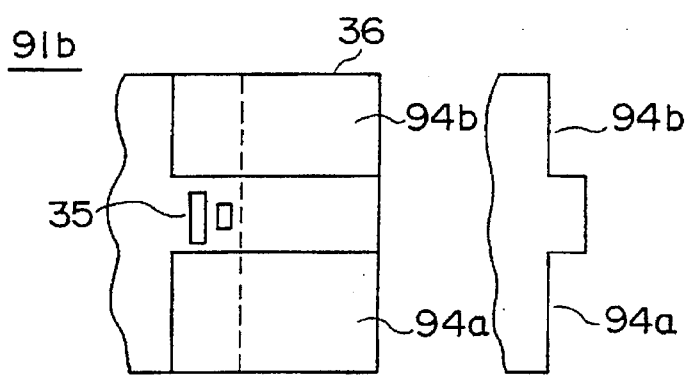
FIGS. 21A, 21B and 21C show other shapes of grooves of the magnetic head of the fourth embodiment.
Figure 21C:
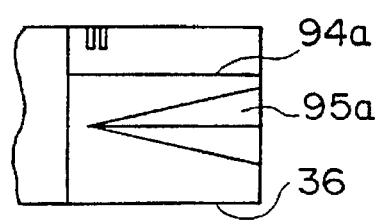

FIGS. 21A, 21B and 21C show another possible configuration of the grooves in the fourth embodiment. FIG. 21A is a plan view of a part including the thin-film element, FIG. 21B is a rear view of the end face of the protective film, and FIG. 21C is a side view of the part including the thin-film element.

The magnetic head 91b shown in FIGS. 21A, 21B and 21C is constructed such that step-like recesses 94a and 94b are formed by mask ion milling or the like so as to extend along both sides of the thin-film element 35 from the neighborhood of the thin-film element 35 to the end of the protective film 36, at which end air exits. Further, as shown in FIG. 21C, grooves 95a and 95b (the groove 95b is not shown in the figure) having a cross section of a letter V are formed, for example, by grinding, on the sides of the protective film 36, the grooves 95a and 95b becoming increasingly deeper as they approach toward the end of the protective film 36.

The steps 94a and 94b and the grooves 95a and 95b on both sides of the film 36 ensure that the surface area near the thin-film element 35 is increased, that the cooling effect is increased, and that only a small degree of swelling, induced by the temperature rise, of the protective film 36 occurs in the surface thereof facing disk. Accordingly, it is possible to achieve a small clearance of the magnetic head 92b with respect to the magnetic disk.

While the fourth embodiment has been described assuming that the grooves 92a, 92b, 93a, 93b, 95a, and 95b having a cross section of a letter V and steps 94a and 94b are formed to extend from the neighborhood of the thin-film element 35 to the protective film 36, any configuration is acceptable as long as the requirement of increasing the surface area is met.

By combining the fourth embodiment shown in FIGS. 20A–20C and 21A–21C with the first through third embodiments, it is possible to achieve an even small clearance of the magnetic head.

The present invention is not limited to the above described embodiments, and variations and modifications may be made without departing from the scope of the present invention.

What is claimed is:

1. A method for manufacturing a magnetic head in which a thin-film element part for writing and/or reading information is formed on an end of a slider that floats over a recording medium, air exiting at said end, said method comprising the steps of:

forming said thin-film element part on a wafer by forming coils, magnetic films, and gaps for writing and/or reading information, the length of the slider corresponding to the thickness of the wafer, forming a protective film around said thin-film element part, and forming, in said protective film near said gaps, grooves having a predetermined configuration to serve as recesses of said protective film.

2. The magnetic head manufacturing method as claimed in claim 3, wherein the thin-film element part includes a magnetoresistant element having conductive members connected to the ends thereof.

3. The magnetic head manufacturing method as claimed in claim 1, wherein said grooves are formed by etching or by a cutting tool having a predetermined cross section.

4. The magnetic head manufacturing method as claimed in claim 2, wherein said grooves are formed by etching or by a cutting tool having a predetermined cross section.

5. The magnetic head manufacturing method as claimed in claim 1, further comprising the step of:

cutting said wafer across its thickness to produce individual thin-film element parts.

* * * * *

UNITED STATES PATENT AND TRADEMARK OFFICE
CERTIFICATE OF CORRECTION

PATENT NO. : 5,634,259
DATED : June 3, 1997
INVENTOR(S) : Sone et al.

It is certified that error appears in the above-indentified patent and that said Letters Patent is hereby corrected as shown below:

Column 5, line 46, delete "h=0,054" and insert --h=0.054-- therefor.

Column 5, line 47, delete "i=0,255" and insert --i=0.255-- therefor.

Column 12, line 35, delete "claim 3" and insert --claim 1-- therefor.

Signed and Sealed this

Twenty-third Day of June, 1998

Attest:

BRUCE LEHMAN

*Attesting Officer*      *Commissioner of Patents and Trademarks*